US008019056B2

(12) United States Patent
Worley et al.

(10) Patent No.: US 8,019,056 B2
(45) Date of Patent: Sep. 13, 2011

(54) INTERACTIVE PRE-PROGRAMMED VOICE RESPONSE SYSTEM

(75) Inventors: Christopher Scott Worley, Fort Collins, CO (US); Robert D. Gardner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3168 days.

(21) Appl. No.: 09/899,382

(22) Filed: Jul. 3, 2001

(65) Prior Publication Data

US 2003/0008638 A1 Jan. 9, 2003

(51) Int. Cl.
*H04M 11/06* (2006.01)
*H04M 11/10* (2006.01)

(52) U.S. Cl. .................... 379/88.18; 379/84; 379/88.03; 379/88.15; 379/88.25; 379/201.11; 455/413; 455/458; 455/563; 455/566; 704/260; 709/225

(58) Field of Classification Search .... 379/88.13–88.16, 379/88.19–88.24, 88.27, 93.17, 93.23, 211.01, 379/84, 88.14, 387.01, 88.03, 88.25, 201.11; 455/412.1–415, 466, 563, 413, 414.1, 417, 455/418, 458, 263, 566, 567; 709/225; 704/260
See application file for complete search history.

(56) References Cited

U.S. PATENT DOCUMENTS

| | | | | |
|---|---|---|---|---|
| 4,071,698 A * | 1/1978 | Barger et al. | .................... | 379/84 |
| 4,943,995 A * | 7/1990 | Daudelin et al. | ........... | 379/88.03 |
| 5,327,486 A * | 7/1994 | Wolff et al. | ................. | 379/93.23 |
| 5,479,491 A * | 12/1995 | Herrero Garcia et al. | . | 379/88.15 |
| 5,758,280 A * | 5/1998 | Kimura | ....................... | 455/412.2 |
| 5,790,957 A * | 8/1998 | Heidari | ....................... | 455/553.1 |
| 6,018,671 A * | 1/2000 | Bremer | ......................... | 455/567 |
| 6,219,413 B1* | 4/2001 | Burg | ......................... | 379/215.01 |
| 6,477,246 B1* | 11/2002 | Dolan et al. | ............. | 379/211.02 |
| 6,490,343 B2* | 12/2002 | Smith et al. | ...................... | 379/52 |
| 6,539,218 B2* | 3/2003 | Higuchi et al. | ............. | 455/412.2 |
| 6,631,182 B1* | 10/2003 | Schwab et al. | ............. | 379/88.19 |
| 6,741,678 B2* | 5/2004 | Cannell et al. | ............. | 379/88.14 |
| 6,768,789 B1* | 7/2004 | Wilk | ........................... | 379/67.1 |
| 6,782,252 B1* | 8/2004 | Kang et al. | .................. | 455/414.1 |
| 6,789,064 B2* | 9/2004 | Koh | ............................ | 704/260 |
| 6,823,184 B1* | 11/2004 | Nelson | .......................... | 455/418 |
| 6,842,622 B2* | 1/2005 | Peters et al. | ................... | 455/458 |
| 6,941,131 B2* | 9/2005 | Roderique | ..................... | 455/417 |
| 7,106,852 B1* | 9/2006 | Nelson et al. | ............. | 379/387.01 |
| 7,209,966 B2* | 4/2007 | Schwartz et al. | ............. | 709/225 |
| 7,492,884 B2* | 2/2009 | Schwab et al. | ........... | 379/201.11 |
| 2005/0053206 A1* | 3/2005 | Chingon et al. | ........... | 379/88.19 |

OTHER PUBLICATIONS

Web page at http://electronicsusa.com/mk40.html regarding Model MK-40; web page attached is from Aug. 7, 2001.

* cited by examiner

*Primary Examiner* — Gerald Gauthier

(57) ABSTRACT

As apparatus for responding silently to incoming calls in a communication system. Such an apparatus provides the capability to respond to incoming calls in the communication system which could be, for example, a telephone system, for those cases necessitating minimal disruptions such as wherein the telephone user receiving the call is in a meeting or other group situation. With the system disclosed herein, the telephone user can respond to the caller immediately with pre-recorded responses. Special responses can be pre-recorder for special situations or special callers.

26 Claims, 6 Drawing Sheets

INTERACTIVE PRE-PROGRAMMED VOICE RESPONSE SYSTEM

FIELD OF THE INVENTION

The present invention relates generally to telephone systems and, more particularly, to telephone systems for responding to incoming calls.

BACKGROUND OF THE INVENTION

Telephones are among the most commonly used devices for communication between individuals, both in business and for personal endeavors. The advent of cellular telephones has resulted in an explosion in growth for such systems. Often, however, calls are received at times and in situations either inconvenient or impossible for an immediate response by the recipient.

Several devices are available for addressing special situations. In particular, "voicemail" is available for those times when an individual is either using his telephone, is not available to answer, or chooses not to answer. In these cases, the caller is transferred to a system wherein he may leave a voice message which is recorded and stored for the recipient's later review and possible response. The recipient accesses those messages left for him typically by dialing a special number and then entering his telephone number and/or personal password.

Disruptions due to calls from telemarking companies have also become commonplace. The recipient of such calls often does not desire to receive or respond to them. One solution is to direct the caller to a pre-recorded message once the nature of the call has been identified. The time the recipient is directly involved with the call is then minimized, as he may hang up once he has directed the call to the pre-recorded message.

Telephone paging systems are also available. Pagers require that the caller first place a call to the recipient's paging system telephone number and then enter the telephone number to which the caller wishes the recipient to respond. The caller's telephone number is then displayed on the recipient's paging device for the recipient's immediate or later use. The recipient can be notified of the presence of a caller's telephone number on his pager by either an audio signal or by a silent means which is typically a vibration. Voice systems, as opposed to visual displays, are also available for conveying the caller's telephone number, but are more disruptive in group situations, as for example a meeting. Such systems, provide a means for call notification with minimal disruptions. However, they address only calls made to the recipient's pager, not calls made directly to the recipient's telephone.

Another method which can be used specifically with cellular telephones is to silence the ringer. When an incoming call is received, the recipient is notified of its existence via some silent means, as for example by a visual device such as a flashing light or by a vibrating device. The recipient can then move to a more convenient location to answer the call. However, in the process the recipient has been inconvenienced by the necessity to change locations and calls may be lost due to the time required for the transfer of locations.

None of these solutions, however, effectively addresses situations wherein the recipient wishes to establish some level of immediate communication with the caller without having to leave his present location and extricate himself from the situation in which he is involved. In particular, the recipient may receive an important call to which he wishes to respond while in a meeting. To answer the call and/or leave the meeting would result in an unnecessary disruption to either himself or to the other participates in the meeting. Thus, there is a need for an apparatus which would fulfill such needs.

SUMMARY OF THE INVENTION

The present patent document relates to a novel apparatus and method for responding to incoming calls in a communication system, as for example a telephone system. Apparatus and techniques disclosed herein are especially useful in those cases necessitating minimal disruptions such as meetings and other group situations. Previous methods for responding to such calls do not effectively address such conditions. With representative embodiments of the system disclosed herein, the telephone user can respond to the caller immediately with selectable, personalized, pre-recorded messages such as "This is a recorded message. I can hear you, but I am in a situation where I can't speak directly with you right now. Please stay on the line until I can move to a location where I can."; "This is a recorded message. I can hear you, but I am in a situation where I can't speak directly with you right now. I will call you back later."; "This is a recorded message. I can hear you, but I am in a situation where I can't speak directly with you right now. If you have important information for me, please tell me now."; or "Thank you. I will call you back as soon as I can." Messages can also be prerecorded for anticipated, specialized situations. In the following detailed description and in the several figures of the drawings, like elements are identified with like reference numerals.

A primary advantage of the embodiments as described in the present patent document over prior systems is that this system provides a telephone user the opportunity to establish immediate communication with the caller without having to leave his present location and extricate himself from the situation in which he is involved. In particular, the recipient may receive an important call to which he wishes to respond while in a meeting. To answer the call and/or leave the meeting would result in an unnecessary disruption to either himself or to the other participates in the meeting. With the system disclosed herein, the telephone user can respond to the caller immediately with pre-recorded messages. The system comprises three modes, (1) record, (2) review, and (3) respond modes.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements and.

DETAILED DESCRIPTION OF THE PREFERRED EMBODIMENTS

Figure 1:
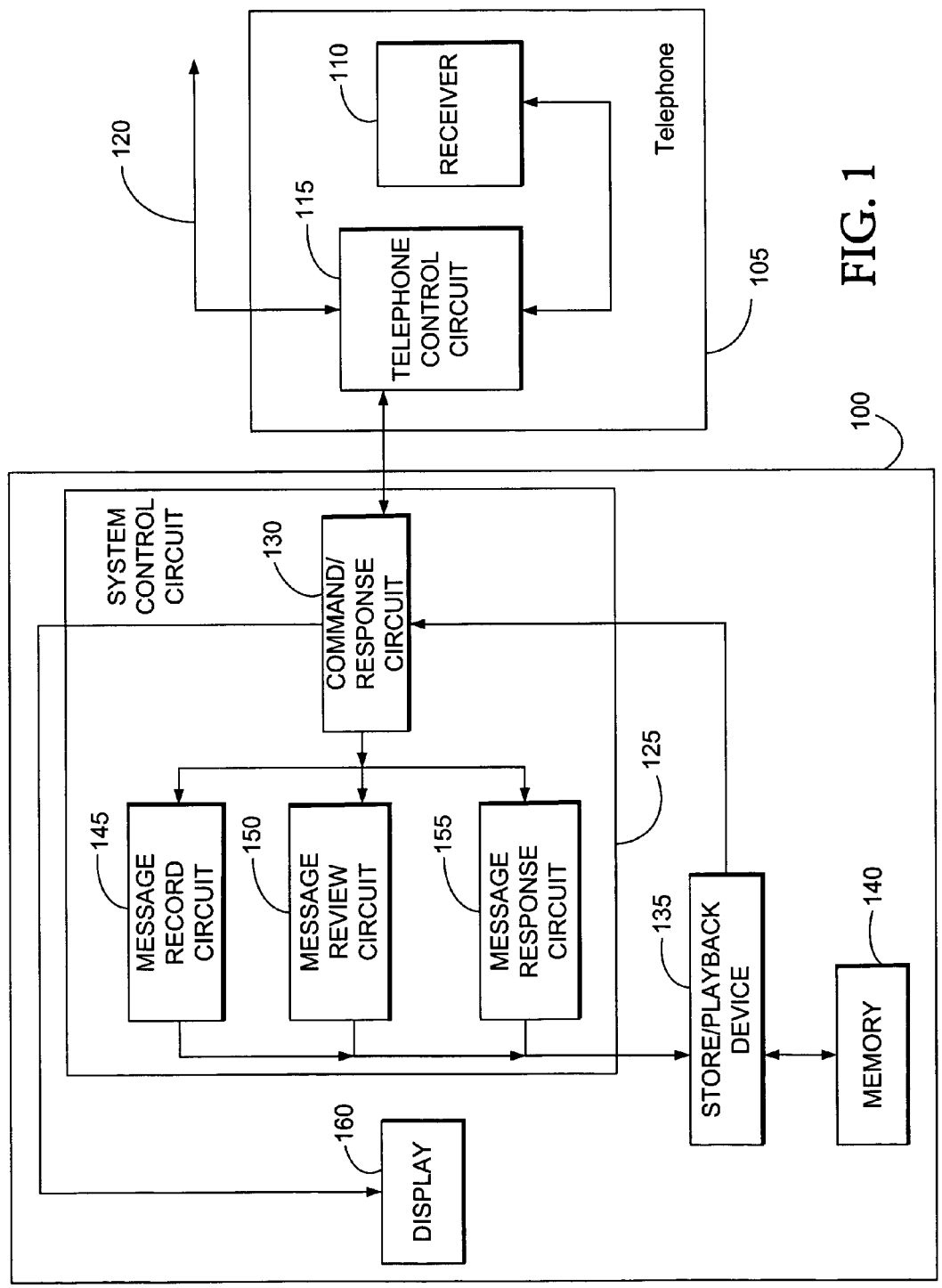
FIG. 1 is a drawing of an interactive pre-programmed voice response system as described in various representative embodiments of the present patent document.

As shown in the drawings for purposes of illustration, the present patent document relates to a novel apparatus and method for responding to incoming calls in a communication system, as for example a telephone system. Apparatus and techniques disclosed herein are especially useful in those cases necessitating minimal disruptions such as meetings and other group situations. Previous methods for responding to such calls do not effectively address such conditions. With representative embodiments of the system disclosed herein, the telephone user can respond to the caller immediately with selectable, personalized, pre-recorded messages such as "This is a recorded message. I can hear you, but I am in a situation where I can't speak directly with you right now. Please stay on the line until I can move to a location where I can."; "This is a recorded message. I can hear you, but I am in a situation where I can't speak directly with you right now. I will call you back later."; "This is a recorded message. I can hear you, but I am in a situation where I can't speak directly with you right now. If you have important information for me, please tell me now."; or "Thank you. I will call you back as soon as I can." Messages can also be prerecorded for anticipated, specialized situations. In the following detailed description and in the several figures of the drawings, like elements are identified with like reference numerals.

1. Representative Embodiment of Apparatus:

FIG. 1 is a drawing of an interactive pre-programmed voice response system 100 as described in various representative embodiments of the present patent document. In FIG. 1, a telephone 105, also referred to herein more generally as a voice communication device 105, comprising a telephone receiver 110 and a telephone control circuit 115. The receiver 110 comprises a listening mechanism, not shown in the figures, for converting electronic signals into audio signals so that the call recipient can listen to incoming calls and a voice detection device, not shown in the figures, for converting the recipient's voice and other audio signals into electronic signals for transmission. The telephone 105 is connected to a telephone line 120 over which the telephone messages are transmitted between a caller who places a call to and a recipient who uses the telephone 105 shown in FIG. 1. The telephone line 120 interconnects the telephone 105 with a communication system, not shown in the figures, which is capable of conveying voice communication signals. In the representative embodiment disclosed herein the communication system is a telephone system.

In a representative embodiment, the voice response system 100 comprises a system control circuit 125, a store/playback device 135, a memory 140, and a display 160 for display of information related to the voice response system 100, as for example a synopsis of one of the prerecorded messages, an error message, a command issued to the system, system status, and/or other information related to the system. In an alternative embodiment, the display 160 is omitted and in another embodiment the display 160 is replaced by the telephone's display. The system control circuit 125 comprises a command/response circuit 130 which controls a message record circuit 145, a message review circuit 150, a message response circuit 155. The system control circuit 125 receives control commands from the telephone control circuit 115 and selects whether the voice response system 100 is in a message record mode, a message review mode, or a message response mode. The command/response circuit 130 routes commands from the telephone control circuit 115 to the message record circuit 145, the message review circuit 150, and the message response circuit 155, as well as routing responses from the store/playback device 135 to the telephone 105, associated visual synopses of the responses to the display 160, and error messages to the display 160. In message record mode, the telephone user can record messages which can then be reviewed in review mode and used in response mode. The system control circuit 125 is in communication with the telephone control circuit 115 and receives control signals from it or some other device. The system control circuit 125 may be in communication with the telephone control circuit 115 via a wireless connection or hard wired connection. The control signals can be originated, for example, by the telephone user pressing pre-determined combinations of switches or buttons, as for example push-buttons, on the telephone 105. The telephone 105 may be, for example, a cellular phone or other wireless telephone. It may also be a fixed phone wired directly to the telephone system. Any of the above mentioned telephones may be a push-button, rotary phone, or other device. The system control circuit 125 is connected to the message record circuit 145, the message review circuit 150, and the message response circuit 155.

When the voice response system 100 is placed in message record mode, the message record circuit 145 determines, in response to signals received from the telephone control circuit 115, which location in the memory 140 that the message is stored by the store/playback device 135. The message record circuit 145 is also used, again in response to signals received from the telephone control circuit 115, to initiate and end the recording of the message being recorded. The message record mode is also used to record a visual message for display on the display 160 as a visual indicator to the telephone user as to which message is located in which memory location. Memory locations are selected via selections made typically on the telephone control circuit 115.

When the voice response system 100 is placed in message review mode, the message record circuit 145 determines, in response to signals typically received from the telephone control circuit 115, which message stored in the memory 140 will be reviewed. The message to be reviewed is retrieved from memory and played back vis the store/playback device 135 to the telephone control circuit 115 which in turn passes it onto the receiver 110 allowing the telephone user to listen to the message which had been previously recorded. The synopsis of the message can be displayed on the display 160 before, during and/or after play back of the message being reviewed. The message record circuit 145 can also be used, again in response to signals received from the telephone control circuit 115, to terminate review of the message.

When the voice response system 100 is placed in message response mode, the message response circuit 155 determines, in response to signals received from the telephone control circuit 115, when and which message stored in the memory 140 will be played back. The message to be played back is retrieved from memory and played back vis the store/playback device 135 to the telephone control circuit 115 which in turn passes it onto the caller via the telephone line 120 and the receiver 110 allowing the telephone user to also listen to the message which is being sent to the caller as a response to his telephone call. In representative embodiments, the visual synopsis or other indicator of the message chosen is displayed on the display 160.

Figure 2:
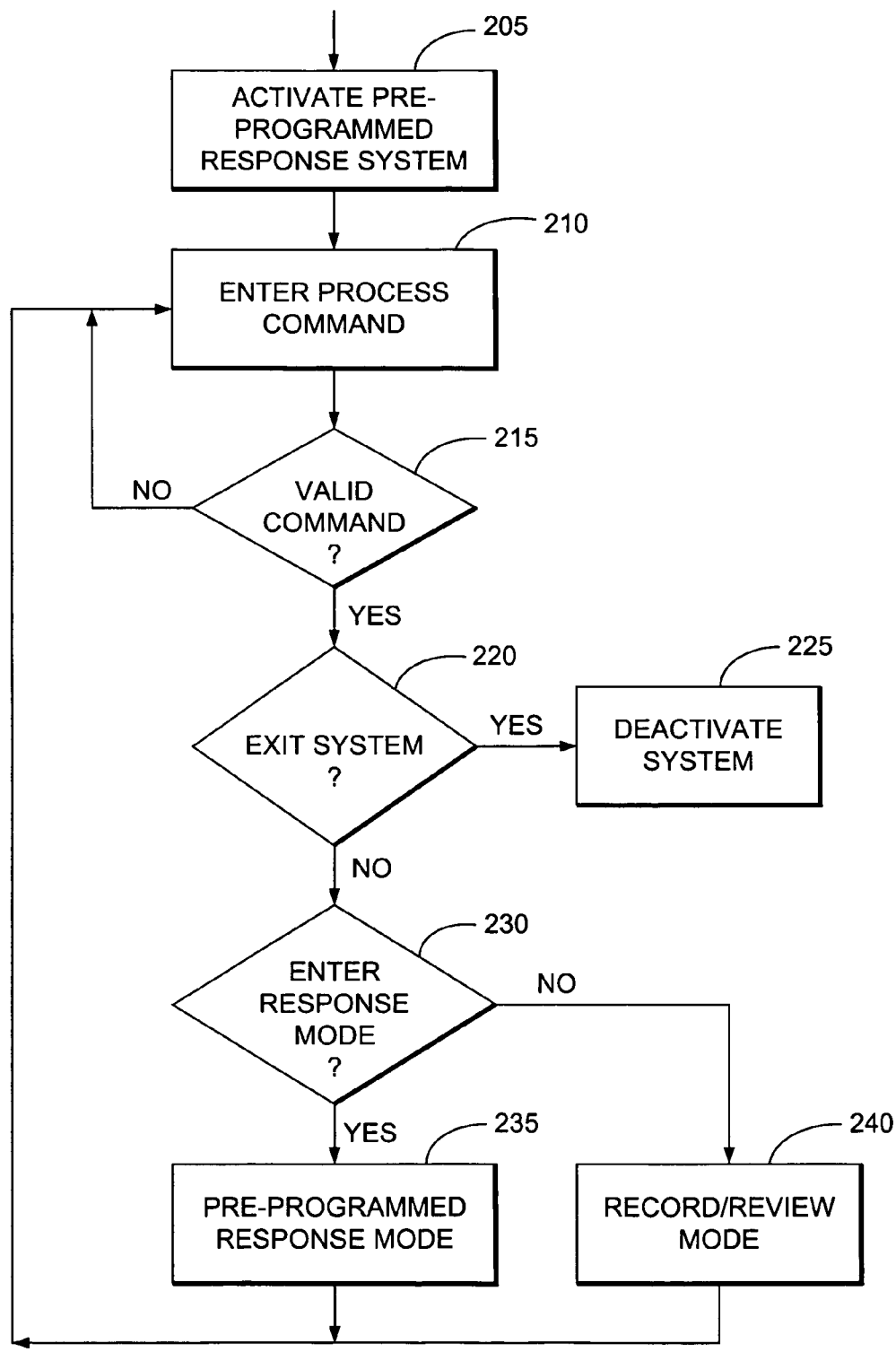
FIG. 2 is a flowchart of operations in the interactive pre-programmed voice response system as described in various representative embodiments of the present patent document.

2. Flow Charts of Operations:

FIG. 2 is a flowchart of operations in the interactive pre-programmed voice response system 100 as described in various representative embodiments of the present patent document. FIG. 2 represents an overall view of the operations which the voice response system 100 performs in the representative embodiment.

In block 205 the interactive pre-programmed voice response system 100 is activated. Typically at this point, the display 160 will display a message requesting the telephone user to select a system mode to activate. Block 205 then transfers control to block 210.

In block 210 the telephone user enters a process command. The process command entered by the telephone user instructs the system control circuit 125 as to which mode—i.e., the message record mode, the message review mode, or the message respond mode—it is to activate or it may instruct the system to deactivate itself. Upon activation in an alternative representative embodiment, the voice response system 100 may automatically enter one of the three modes, as for example the message response mode of block 235 below, without the telephone user entering the process command of block 210. Block 210 then transfers control to block 215.

In block 215, the system control circuit 125 checks the validity of the command received from the telephone control circuit 115. When an invalid command is received, a message to that effect and requesting a new command is displayed on the display 160 and control is returned to block 210. Otherwise, block 215 then transfers control to block 220.

When command to deactivate the system is received by the system control circuit 125, block 220 transfers control to block 225. Otherwise, block 220 transfers control to block 230.

In block 225, the voice response system 100 is deactivated. The telephone 105 then functions as it normally would without the voice response system 100.

When the process command entered in block 210 instructed the system control circuit 125 to activate the response mode, block 230 transfers control to block 235. An expansion of the functions comprising block 235 is found in FIG. 6. Otherwise, block 230 transfers control to block 240. An expansion of the functions comprising block 240 is found in FIG. 3 and subsequently in FIGS. 4 and 5.

When control is transferred to block 235 and when the functions of block 235 are completed, control is transferred from block 235 back to block 210.

When control is transferred to block 240 and when the functions of block 240 are completed, control is transferred from block 240 back to block 210.

Figure 3:
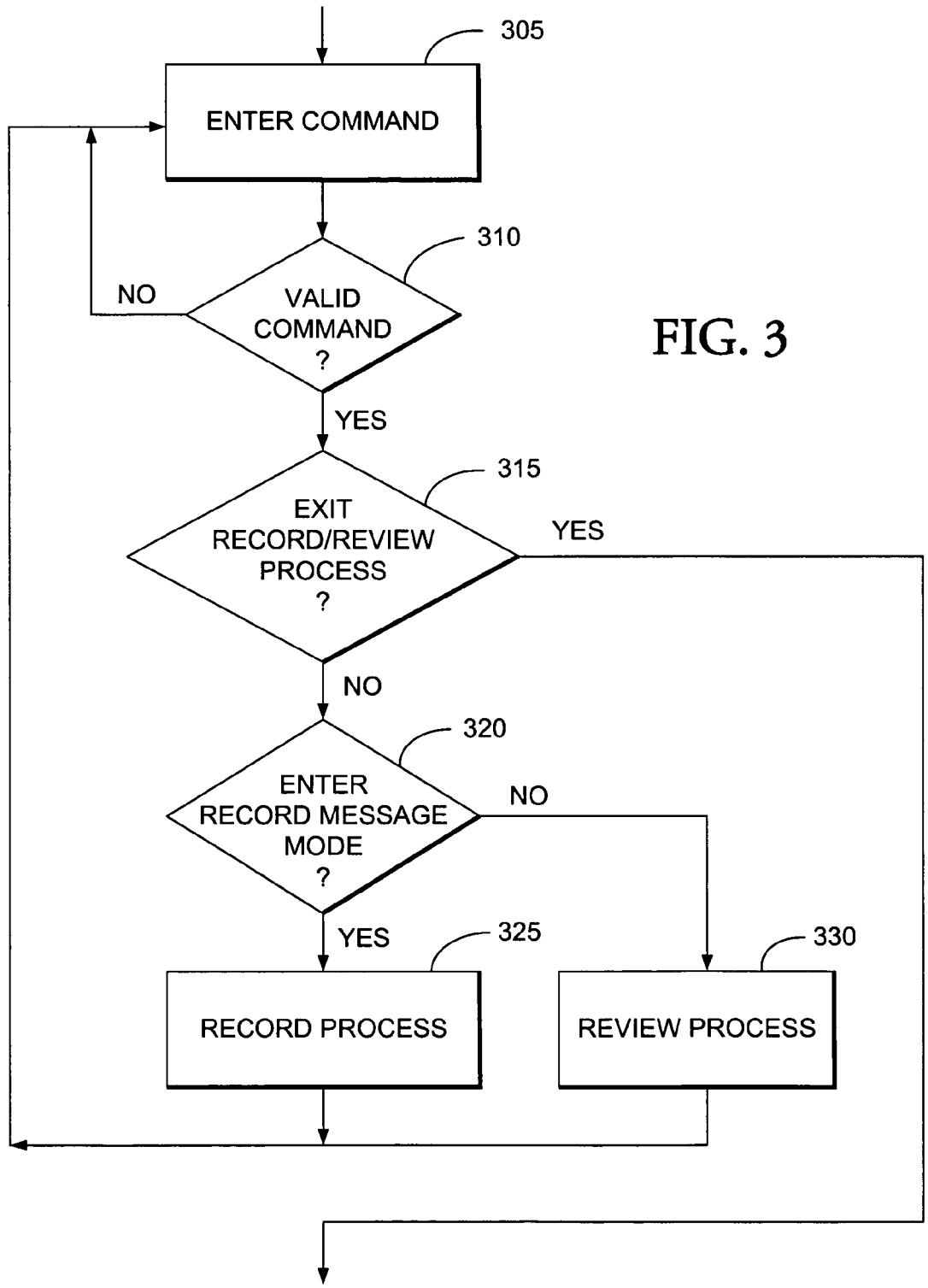
FIG. 3 is another flowchart of operations in the interactive pre-programmed voice response system as described in various representative embodiments of the present patent document.

FIG. 3 is another flowchart of operations in the interactive pre-programmed voice response system 100 as described in various representative embodiments of the present patent document. FIG. 3 is an expansion of the functions comprising block 240 of FIG. 2.

In block 305 the telephone user enters a second process command. The process command initially entered by the telephone user instructs the system control circuit 125 as to which of the message record mode or the message review mode to enter, or the process command entered in block 305 may instruct the system to exit whichever of the message record mode or message review mode the system is in. In another representative embodiment, the process command entered in block 210 instructs the system as to whether to enter the message record mode or the message review mode. In which case blocks 305, 310, and 315 are bypassed upon entering block 240. Block 305 then transfers control to block 310.

In block 310, the system control circuit 125 checks the validity of the command received from the telephone control circuit 115. When an invalid command is received, a message to that effect and requesting a new command is displayed on the display 160 and control is returned to block 305. Otherwise, block 310 then transfers control to block 315.

When command to exit whichever of the message record mode or message review mode the system is in is entered in block 305, block 315 transfers control to block 210 of FIG. 2. Otherwise, block 315 transfers control to block 320.

When the command to enter the message record mode is received in block 305, block 320 transfers control to block 325. Otherwise block 320 transfers control to block 330. An expansion of the functions comprising block 325 is found in FIG. 4, and an expansion of the functions comprising block 330 is found in FIG. 5.

Figure 4:
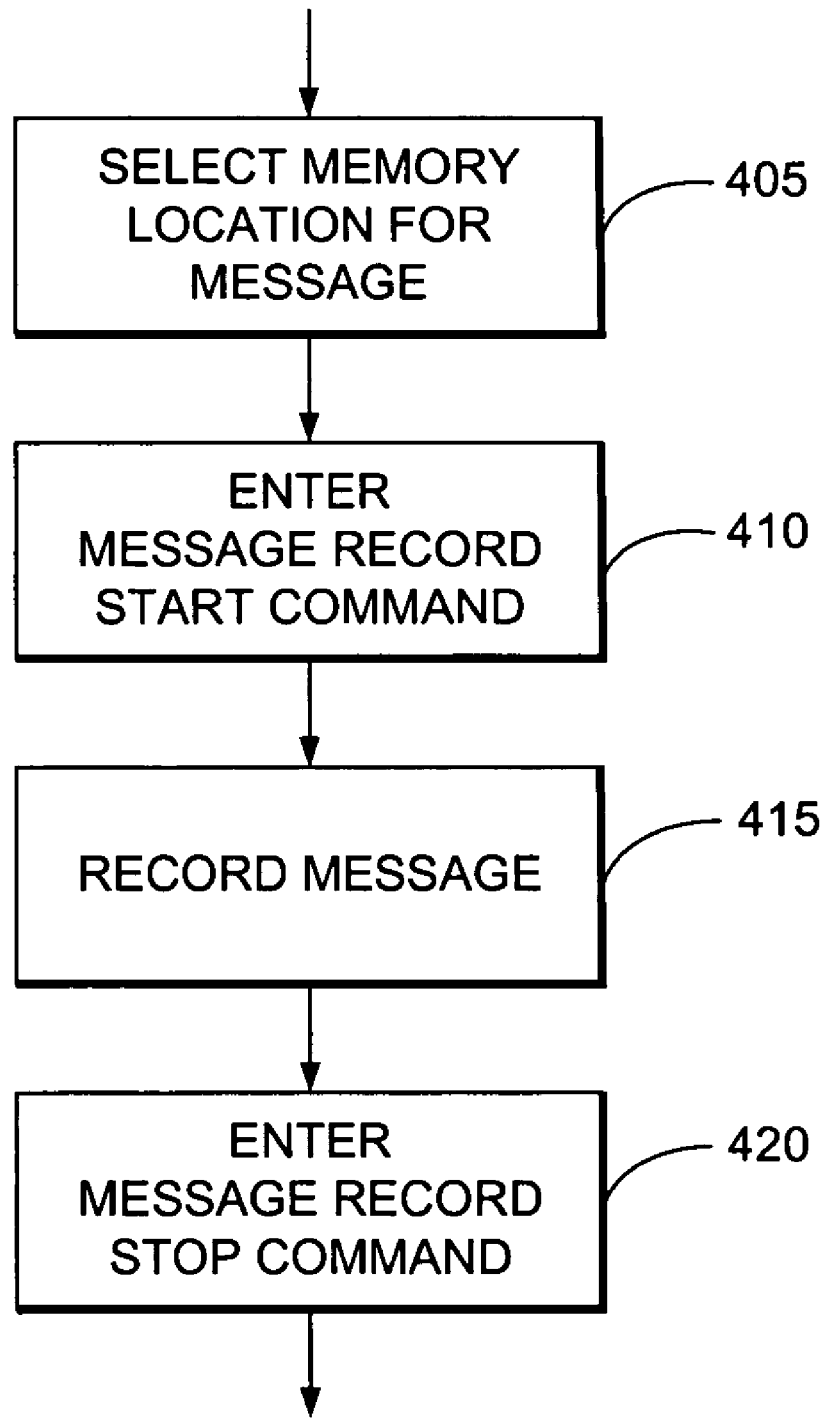
FIG. 4 is yet another flowchart of operations in the interactive pre-programmed voice response system as described in various representative embodiments of the present patent document.

FIG. 4 is yet another flowchart of operations in the interactive pre-programmed voice response system 100 as described in various representative embodiments of the present patent document. FIG. 4 is an expansion of the functions comprising block 325 of FIG. 3.

In block 405, the telephone user selects the memory location for storing the message to be recorded in the following blocks. In an optional embodiment, the memory location is automatically determined by the voice response system 100. Block 405 then transfers control to block 410.

In block 410, the telephone user enters a command to start recording the message to be subsequently used to respond to an incoming call. Block 410 then transfers control to block 415.

In block 415, the telephone user records the message. Block 415 then transfers control to block 420.

In block 420, the telephone user enters a command to stop recording the message. Block 420 then transfers control to block 325 of FIG. 3 which subsequently transfers control to block 305.

Figure 5:
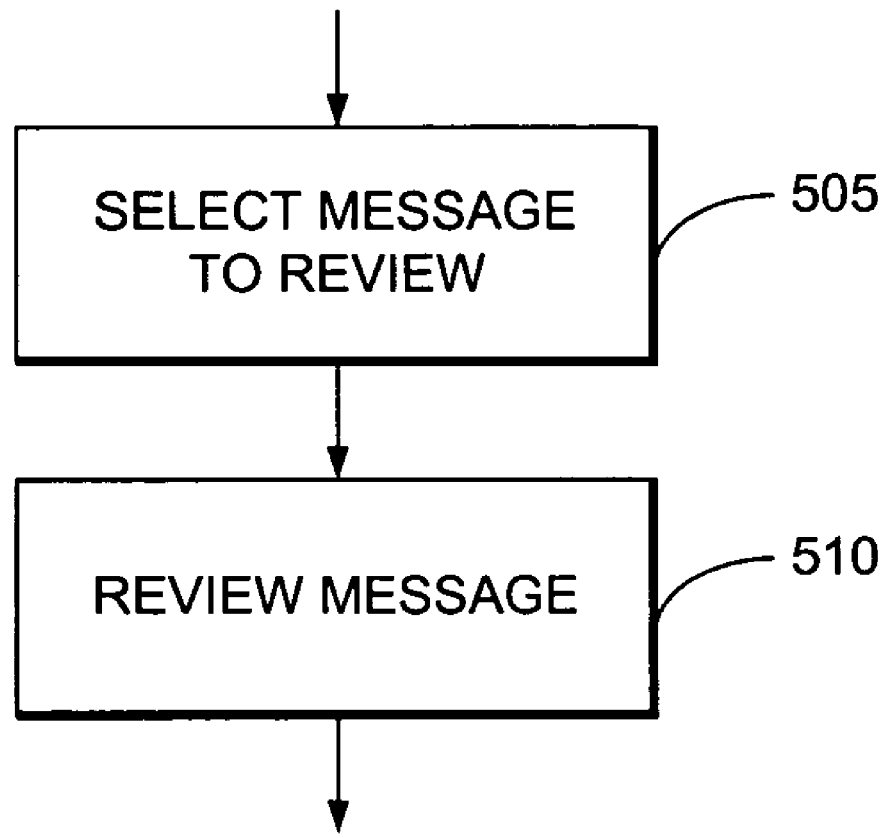
FIG. 5 is still another flowchart of operations in the interactive pre-programmed voice response system as described in various representative embodiments of the present patent document.

FIG. 5 is still another flowchart of operations in the interactive pre-programmed voice response system 100 as described in various representative embodiments of the present patent document. FIG. 5 is an expansion of the functions comprising block 330 of FIG. 3.

In block 505 the telephone user selects a particular pre-recorded message to review. Block 505 then transfers control to block 510.

In block 510, the telephone user reviews the message selected in block 505. This review typically comprises listening to the recorded message and/or reading the associated visual message displayed on the display. Block 510 then transfers control to block 330 of FIG. 3 which subsequently transfers control to block 305.

Figure 6:
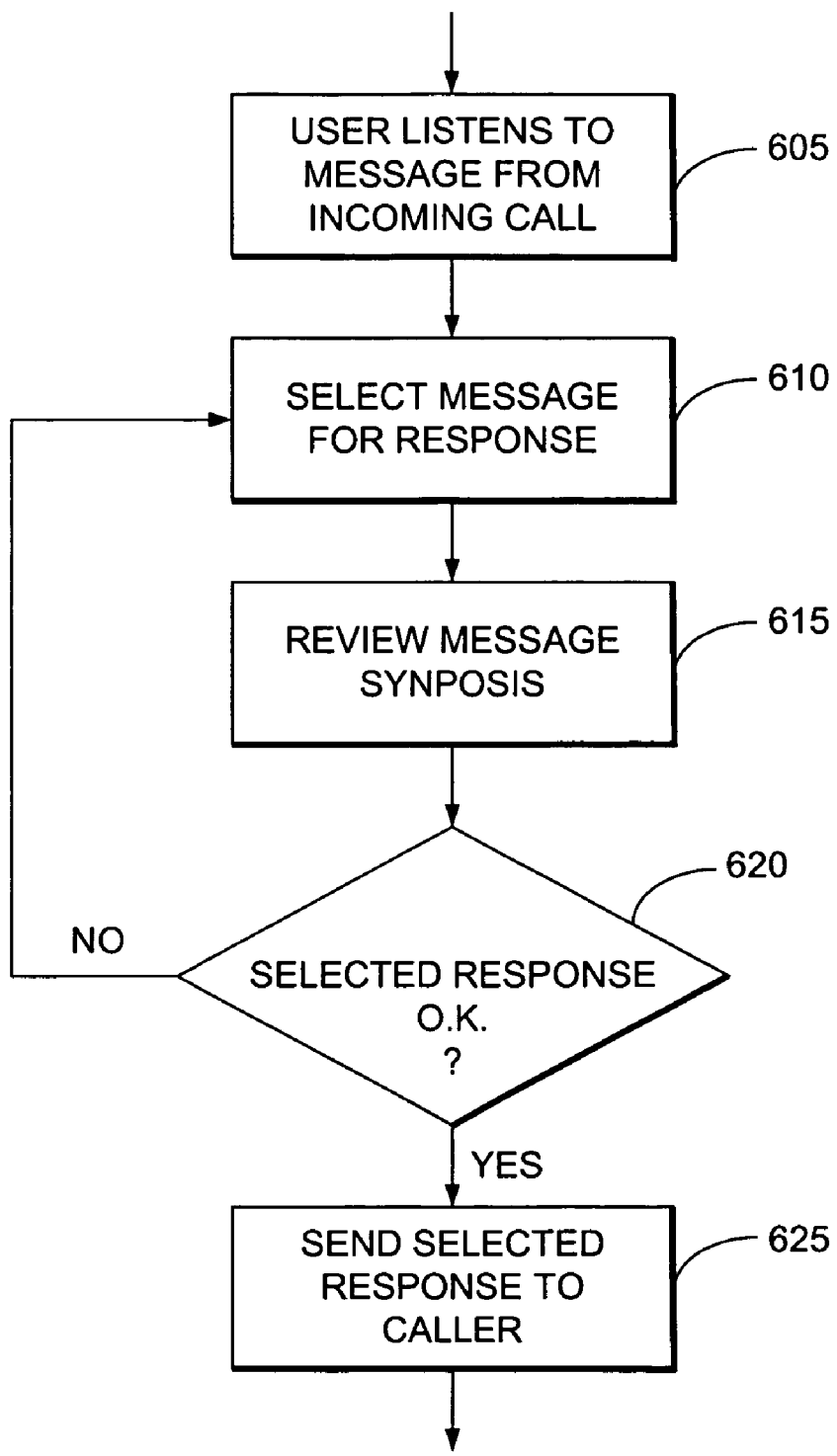
FIG. 6 is an additional flowchart of operations in the interactive pre-programmed voice response system as described in various representative embodiments of the present patent document.

FIG. 6 is an additional flowchart of operations in the interactive pre-programmed voice response system as described in various representative embodiments of the present patent document. FIG. 6 is an expansion of the functions comprising block 235 of FIG. 2.

In block 605 the telephone user listens to a voice message from an incoming call. Block 605 then transfers control to block 610.

In block 610, the telephone user selects a particular pre-recorded message with which to respond to the caller. Block 610 then transfers control to block 615.

In block 615, the telephone user typically reviews on the display 160 the synopsis of the pre-recorded response message that he has selected. Block 615 then transfers control to block 620.

When the response selected is acceptable to the user, block 620 transfers control to block 625.

In block 625, the telephone user sends the pre-recorded response selected in block 610. Block 625 then transfers control to block 235 of FIG. 2 which subsequently transfers control to block 210.

In other representative embodiments, the display is used to display the synopsis of stored response messages prior to their actual transmission to the caller. The telephone user is provided the opportunity to reject a selected message and select an alternative message prior to transmission to the caller.

3. Summary:

In summary, an interactive pre-programmed voice response system has been disclosed herein in representative embodiments. A primary advantage of the embodiments as described in the present patent document over prior systems is that this system provides a telephone user the opportunity to establish immediate communication with the caller without having to leave his present location and extricate himself from the situation in which he is involved. In particular, the recipient may receive an important call to which he wishes to respond while in a meeting. To answer the call and/or leave the meeting would result in an unnecessary disruption to either himself or to the other participates in the meeting. With the system disclosed herein, the telephone user can respond to the caller immediately with pre-recorded messages such as "This is a recorded message. I can hear you, but I am in a situation where I can't speak directly with you right now, but please stay on the line until I can move to a location where I can."; "This is a recorded message. I can hear you, but I am in a situation where I can't speak directly with you right now. I will call you back later."; "This is a recorded message. I can hear you, but I am in a situation where I can't speak directly with you right now. If you have important information for me, please tell me now."; "Thank you. I will call you back as soon as I can."; or some similar response.

While the present invention has been described in detail in relation to representative embodiments thereof, the described embodiments have been presented by way of example and not by way of limitation. It will be understood by those skilled in the art that various changes may be made in the form and details of the described embodiments resulting in equivalent embodiments that remain within the scope of the appended claims.

What is claimed is:

1. An apparatus for interactively replying to voice messages received via a voice communication device, which comprises:
    a memory, wherein the memory is capable of storing multiple personalized vocal responses and a written synopsis of each stored, personalized vocal response;
    a store/playback device connected to the memory, wherein the store/playback device is capable of storing the personalized vocal responses in the memory; and
    a system control circuit connected to the store/playback device, wherein the system control circuit is capable of communication with the voice communication device including allowing a user to listen to the voice messages received via the voice communication device while the voice message is being received, has capability to select a specified stored, personalized vocal response in reply to a playback command initiated by the user, and has capability to playback, via the system control circuit, the specified stored, personalized vocal response to the voice communication device in reply to the command while the voice message is being received.

2. The apparatus as recited in claim 1 further comprising a visual display connected to the system control circuit, wherein the visual display is capable of displaying the written synopsis of the specified stored, personalized vocal response.

3. The apparatus as recited in claim 1, wherein the system control circuit has capability to further select a record mode in reply to a record mode command initiated by the user, wherein in record mode the record/playback device is capable of recording the personalized vocal responses into the memory.

4. The apparatus as recited in claim 1, wherein the system control circuit has capability to further select a review mode in reply to a review mode command initiated by the user, wherein in review mode the record/playback device is capable of playing back the personalized vocal responses for review by the user.

5. The apparatus as recited in claim 1, wherein the user has capability of issuing the playback command via controls on the system control circuit.

6. The apparatus as recited in claim 1, wherein the user has capability of issuing the playback command via the voice communication device.

7. The apparatus as recited in claim 6, wherein the voice communication device is a telephone.

8. The apparatus as recited in claim 7, wherein the telephone is capable of wireless operation.

9. The apparatus as recited in claim 7, wherein the telephone is a cellular telephone.

10. The apparatus as recited in claim 1, wherein the voice communication device is a telephone.

11. The apparatus as recited in claim 10, wherein the telephone is capable of wireless operation.

12. The apparatus as recited in claim 10, wherein the telephone is a cellular telephone.

13. The apparatus as recited in claim 10, wherein the messages are received via the telephone connected to a telephone system.

14. The apparatus as recited in claim 13, wherein system control circuit adjustment is effected via actuating at least one switch on the telephone.

15. The apparatus as recited in claim 14, wherein the switch on the telephone is a push-button.

16. A method, which comprises the method steps of:
    receiving a voice message from a caller via a voice communication device connected to a voice communication system, including allowing a user to listen to the voice message received via the voice communication device as the voice message is being received;
    selecting a personalized vocal response as the voice message is being received, wherein the personalized vocal response is selected from multiple personalized vocal responses previously stored in a memory and wherein the selected personalized vocal response is chosen based upon the content of the voice message received;
    playing back the selected personalized vocal response to the voice communication device as the voice message is being received; and
    repeating the above method steps until the caller disconnects from the voice communication system.

17. The method as recited in claim 16, which further comprises the steps of:
  selecting a record mode in reply to a record mode command initiated by the user; and
  when in record mode, recording the personalized vocal responses into the memory.

18. The method as recited in claim 16, which further comprises the steps of:
  selecting a review mode in reply to a review mode command initiated by the user; and
  when in review mode, playing back the personalized vocal responses for review.

19. The method as recited in claim 16, wherein the playback command is issued via controls on a system control circuit connected to a store/playback device.

20. The method as recited in claim 16, wherein the playback command is issued via controls on the voice communication device.

21. The method as recited in claim 16, wherein the voice communication device is a telephone.

22. The method as recited in claim 21, wherein the telephone is capable of wireless operation.

23. The method as recited in claim 21, wherein the telephone is a cellular telephone.

24. The method as recited in claim 21, wherein the messages are received via the telephone connected to a telephone system.

25. The method as recited in claim 21, wherein system control circuit adjustment is effected via actuating at least one switch on the telephone.

26. The method as recited in claim 25, wherein the switch on the telephone is a push-button.

* * * * *